(12) United States Patent  
Albanese et al.

(10) Patent No.: US 8,180,904 B1
(45) Date of Patent: May 15, 2012

(54) DATA ROUTING AND MANAGEMENT WITH ROUTING PATH SELECTIVITY

(75) Inventors: Michael J. Albanese, San Jose, CA (US); James Roland Henderson, Morgan Hill, CA (US); Keith Barraclough, Mountain View, CA (US); David Irvine, San Jose, CA (US)

(73) Assignee: Nokia Corporation, Espoo (FI)

( * ) Notice: Subject to any disclaimer, the term of this patent is extended or adjusted under 35 U.S.C. 154(b) by 1429 days.

(21) Appl. No.: 11/389,492

(22) Filed: Mar. 24, 2006

Related U.S. Application Data (63) Continuation-in-part of application No. 09/843,249, filed on Apr. 26, 2001, now Pat. No. 7,139,834, and a continuation-in-part of application No. 11/056,345, filed on Feb. 11, 2005.

(51) Int. Cl.
*G06F 15/173* (2006.01)

(52) U.S. Cl. .................. 709/228; 709/229; 709/238

(58) Field of Classification Search .................. None
See application file for complete search history.

(56) References Cited

U.S. PATENT DOCUMENTS

| | | |
|---|---|---|
| 4,979,118 A | 12/1990 | Kheradpir |
| 5,774,660 A | 6/1998 | Brendel et al. |
| 5,862,325 A | 1/1999 | Reed et al. |
| 5,920,701 A | 7/1999 | Miller et al. |
| 5,996,022 A | 11/1999 | Krueger et al. |
| 6,006,264 A | 12/1999 | Colby et al. |
| 6,032,227 A | 2/2000 | Shaheen et al. |
| 6,052,718 A * | 4/2000 | Gifford .................. 709/219 |
| 6,067,565 A | 5/2000 | Horvitz |
| 6,112,225 A | 8/2000 | Kraft et al. |
| 6,161,133 A | 12/2000 | Kikinis |
| 6,167,438 A | 12/2000 | Yates et al. |
| 6,240,453 B1 | 5/2001 | Chang et al. |
| 6,298,373 B1 | 10/2001 | Burns et al. |
| 6,304,909 B1 | 10/2001 | Mullaly et al. |
| 6,304,913 B1 | 10/2001 | Rune |
| 6,308,209 B1 | 10/2001 | Lecheler |

(Continued)

FOREIGN PATENT DOCUMENTS

EP    1 376 398 A2    1/2004

(Continued)

OTHER PUBLICATIONS

Office action for related U.S. Appl. No. 11/219,529 dated Oct. 7, 2010, pp. 1-29.

(Continued)

*Primary Examiner* — Patrice Winder
(74) *Attorney, Agent, or Firm* — Ditthavong Mori & Steiner, P.C.

(57) ABSTRACT

Data transfer over a network is effected in a manner that facilitates the use of available communications channels and makes possible enhanced data routing control and monitoring. According to an example embodiment of the present invention, data is routed to a remote (e.g., mobile) user device over a packet-communicating network having a plurality of communication links. When the transfer of data to the remote use device is requested or otherwise initiated, a host server selects one of the plurality of communications links available for transferring the data to the remote user device. The host server then uses routing functions (e.g., software) at a registered data source to access and transfer data from the registered data source to the remote user device.

34 Claims, 3 Drawing Sheets

U.S. PATENT DOCUMENTS

| | | | |
|---|---|---|---|
| 6,308,222 B1 | 10/2001 | Brueger et al. | |
| 6,360,333 B1 | 3/2002 | Jansen et al. | |
| 6,407,680 B1 | 6/2002 | Lai et al. | |
| 6,470,189 B1 | 10/2002 | Hill et al. | |
| 6,473,404 B1* | 10/2002 | Kaplan et al. | 370/238 |
| 6,490,625 B1 | 12/2002 | Islam et al. | |
| 6,493,758 B1 | 12/2002 | McLain | |
| 6,496,980 B1 | 12/2002 | Tillman et al. | |
| 6,505,160 B1 | 1/2003 | Levy et al. | |
| 6,516,192 B1* | 2/2003 | Spaur et al. | 455/450 |
| 6,577,601 B1 | 6/2003 | Wolpert | |
| 6,593,860 B2 | 7/2003 | Lai et al. | |
| 6,678,244 B1 | 1/2004 | Appanna et al. | |
| 6,697,333 B1 | 2/2004 | Bawa et al. | |
| 6,732,180 B1 | 5/2004 | Hale et al. | |
| 6,751,664 B1 | 6/2004 | Kogan et al. | |
| 6,801,777 B2* | 10/2004 | Rusch | 455/452.2 |
| 6,826,597 B1 | 11/2004 | Lonnroth et al. | |
| 6,850,980 B1* | 2/2005 | Gourlay | 709/226 |
| 6,871,236 B2 | 3/2005 | Fishman et al. | |
| 6,888,477 B2 | 5/2005 | Lai et al. | |
| 6,915,328 B2 | 7/2005 | Turnbull | |
| 6,920,637 B2 | 7/2005 | Mason et al. | |
| 6,937,168 B2 | 8/2005 | Rao et al. | |
| 6,996,720 B1 | 2/2006 | DeMello et al. | |
| 7,010,500 B2 | 3/2006 | Aarnio | |
| 7,035,828 B2 | 4/2006 | Ketonen et al. | |
| 7,075,919 B1 | 7/2006 | Wendt et al. | |
| 7,120,702 B2 | 10/2006 | Huang et al. | |
| 7,133,925 B2 | 11/2006 | Mukherjee et al. | |
| 7,139,834 B1 | 11/2006 | Albanese et al. | |
| 7,200,680 B2 | 4/2007 | Evans et al. | |
| 7,222,292 B2 | 5/2007 | Ali et al. | |
| 7,254,602 B1 | 8/2007 | Boivie | |
| 7,287,214 B2 | 10/2007 | Jenkins et al. | |
| 7,293,115 B2 | 11/2007 | DaCosta et al. | |
| 7,299,362 B2 | 11/2007 | Shen et al. | |
| 7,356,615 B2 | 4/2008 | Cai et al. | |
| 7,483,958 B1 | 1/2009 | Elabbady et al. | |
| 7,502,819 B2 | 3/2009 | Alonso | |
| 7,805,315 B2 | 9/2010 | Goel | |
| 7,827,312 B2 | 11/2010 | Ramaswamy et al. | |
| 7,895,445 B1 | 2/2011 | Albanese et al. | |
| 7,961,645 B2 | 6/2011 | Gudipudi et al. | |
| 2001/0011349 A1* | 8/2001 | Garrison | 709/219 |
| 2001/0047400 A1 | 11/2001 | Coates et al. | |
| 2002/0026491 A1 | 2/2002 | Mason et al. | |
| 2002/0040389 A1 | 4/2002 | Gerba et al. | |
| 2002/0052798 A1 | 5/2002 | Nishikado et al. | |
| 2002/0052855 A1 | 5/2002 | Landesmann | |
| 2002/0052885 A1 | 5/2002 | Levy | |
| 2002/0056004 A1 | 5/2002 | Smith et al. | |
| 2002/0073057 A1* | 6/2002 | Benoit et al. | 707/1 |
| 2002/0083342 A1 | 6/2002 | Webb et al. | |
| 2002/0099796 A1 | 7/2002 | Chou | |
| 2002/0103934 A1 | 8/2002 | Fishman et al. | |
| 2002/0107807 A1 | 8/2002 | Ketonen et al. | |
| 2002/0120574 A1 | 8/2002 | Ezaki | |
| 2002/0120607 A1 | 8/2002 | Price et al. | |
| 2002/0124098 A1 | 9/2002 | Shaw | |
| 2002/0133570 A1* | 9/2002 | Michel | 709/219 |
| 2002/0133626 A1 | 9/2002 | Turnbull | |
| 2002/0161835 A1 | 10/2002 | Ball et al. | |
| 2002/0174246 A1 | 11/2002 | Tanay et al. | |
| 2002/0194324 A1 | 12/2002 | Guha | |
| 2003/0046401 A1 | 3/2003 | Abbott et al. | |
| 2003/0046703 A1 | 3/2003 | Knowles et al. | |
| 2003/0061387 A1 | 3/2003 | Brown et al. | |
| 2003/0088544 A1 | 5/2003 | Kan et al. | |
| 2003/0088686 A1 | 5/2003 | Jennings | |
| 2003/0110234 A1 | 6/2003 | Egli et al. | |
| 2003/0119386 A1 | 6/2003 | Laux et al. | |
| 2003/0172186 A1 | 9/2003 | Dunn et al. | |
| 2003/0177269 A1 | 9/2003 | Robinson et al. | |
| 2003/0194998 A1 | 10/2003 | Bhide | |
| 2003/0200337 A1 | 10/2003 | Jabri et al. | |
| 2003/0204602 A1 | 10/2003 | Hudson et al. | |
| 2004/0003132 A1 | 1/2004 | Stanley et al. | |
| 2004/0032348 A1 | 2/2004 | Lai et al. | |
| 2004/0049462 A1 | 3/2004 | Wang | |
| 2004/0117845 A1 | 6/2004 | Karaoguz et al. | |
| 2004/0122958 A1 | 6/2004 | Wardrop | |
| 2004/0139233 A1 | 7/2004 | Kellerman et al. | |
| 2004/0148434 A1 | 7/2004 | Matsubara et al. | |
| 2004/0148503 A1 | 7/2004 | Sidman | |
| 2004/0199667 A1 | 10/2004 | Dobbins | |
| 2004/0243839 A1 | 12/2004 | Bhatia et al. | |
| 2004/0250291 A1 | 12/2004 | Rao et al. | |
| 2004/0267954 A1 | 12/2004 | Shen | |
| 2005/0033850 A1 | 2/2005 | Kirkland | |
| 2005/0131871 A1 | 6/2005 | Howard et al. | |
| 2005/0132264 A1 | 6/2005 | Joshi et al. | |
| 2005/0148319 A1* | 7/2005 | Himeno | 455/406 |
| 2005/0256870 A1 | 11/2005 | Benco et al. | |
| 2006/0117018 A1 | 6/2006 | Christiansen et al. | |
| 2006/0120385 A1 | 6/2006 | Atchison et al. | |
| 2006/0168318 A1 | 7/2006 | Twiss | |
| 2006/0173974 A1 | 8/2006 | Tang | |
| 2006/0242325 A1 | 10/2006 | Ramaswamy et al. | |
| 2007/0159976 A1* | 7/2007 | Dekeyzer et al. | 370/236 |
| 2007/0174471 A1 | 7/2007 | Van Rossum | |
| 2007/0288247 A1 | 12/2007 | Mackay | |
| 2007/0299681 A1 | 12/2007 | Plastina et al. | |
| 2008/0049642 A1 | 2/2008 | Gudipudi et al. | |
| 2008/0052415 A1 | 2/2008 | Kellerman et al. | |
| 2008/0060038 A1 | 3/2008 | Stallings et al. | |

FOREIGN PATENT DOCUMENTS

| | | |
|---|---|---|
| JP | 2002-132455 A | 5/2002 |
| JP | 2002-351729 A | 12/2002 |
| WO | WO 01/03373 A1 | 1/2001 |

OTHER PUBLICATIONS

Supplementary European Search Report, PCT/US2007068985, Dec. 15, 2009, pp. 1-9.

Office action for related U.S. Appl. No. 11/051,458 dated Mar. 8, 2011, pp. 1-41.

Office action for related U.S. Appl. No. 11/835,061 dated Mar. 2, 2011, pp. 1-20.

Final Office Action for related U.S. Appl. No. 11/051,458, Aug. 18, 2011, pp. 1-18.

Office Action for related U.S. Appl. No. 11/219,529, Jun. 8, 2011, pp. 1-32.

Office Action for related U.S. Appl. No. 11/374,409, Jun. 8, 2011, pp. 1-31.

Office Action for related U.S. Appl. No. 11/408,140, Jul. 13, 2011, pp. 1-33.

Office Action for related U.S. Appl. No. 11/700,345, Jun. 10, 2011, pp. 1-51.

Office Action for related U.S. Appl. No. 11/835,061, Jul. 13, 2011, pp. 1-30.

Russian Office action for corresponding RU application No. 2008149517/08 dated May 20, 2011, pp. 1-11.

BackWeb Foundation 5.5 Technical White Paper, Nov. 1999, pp. 1-49.

Chinese Office action for correspondiong CN app. No. 200680041085.1 dated Jul. 9, 2010, pp. 1-22.

Chinese Office action for correspondiong CN app. No. 200680041085.1 dated Jul. 17, 2009, pp. 1-21.

GPS to do wonders for wireless browsing, Hammer, May 25, 2000, pp. 1-3.

Office action for related U.S. Appl. No. 11/435,357 dated Jul. 29, 2010, pp. 1-24.

Office action for related U.S. Appl. No. 11/835,061 dated Sep. 15, 2010, pp. 1-22.

European Office action for corresponding EP application No. 06718618.9-2413 dated Jan. 21, 2011, 1 page.

European Office action for corresponding EP application No. 06801968.6-2413 dated Feb. 1, 2011, 1 page.

Extended European search report for corresponding EP application No. 06718618.9-2413 dated Jan. 4, 2011, pp. 1-9.

Extended European search report for corresponding EP application No. 06801968.6-2413 dated Jan. 14, 2011, pp. 1-10.

International preliminary report on patentability for corresponding international application No. PCT/US06/32543 dated Jan. 3, 2008, pp. 1-5.

International search report and written opinion for corresponding international application No. PCT/US06/01565 dated Jun. 16, 2006, pp. 1-4.

International search report and written opinion for corresponding international application No. PCT/US06/32543 dated Jun. 5, 2007, pp. 1-7.

Server-directed transcoding, Mogul, J. C., Computer Communications 24, 2001, Elsevier, pp. 155-162.

Office Action for Japanese Application No. 2009-511211 dated Oct. 4, 2011, pp. 1-5.

Office Action for U.S. Appl. No. 11/374,409 dated Oct. 28, 2011, pp. 1-19.

Office Action for U.S. Appl. No. 11/700,345 dated Nov. 18, 2011, pp. 1-39.

* cited by examiner

DATA ROUTING AND MANAGEMENT WITH ROUTING PATH SELECTIVITY

RELATED PATENT DOCUMENTS

This patent document is a continuation-in-part of U.S. patent application Ser. No. 09/843,249 entitled "Data Routing Monitoring and Management," filed Apr. 26, 2001, now U.S. Pat. No. 7,139,834 and of U.S. patent application Ser. No. 11/056,345 entitled "Network-distributed Data Routing," filed Feb. 11, 2005, to each of which priority is claimed under 35 U.S.C. §120 for common subject matter.

FIELD OF THE INVENTION

The present invention relates generally to data communications with remotely-situated data appliances or nodes and, more particularly, to the routing of data from a personal data source to remote packet-communicating devices over the Internet via selective use of available routing paths and/or technologies.

BACKGROUND OF THE INVENTION

As access to the Internet and other communications networks becomes easier, convenient and more readily available, these networks are increasingly used for applications involving the transfer of data such as images, audio, video and other types of streaming data, text and other content. For example, data for computer software, music, video, news services, games and other applications is being requested and delivered via the Internet and, for many applications, via wireless networks such as those implemented for cellular telephone networks.

Content (e.g., audio, images or video) has evolved in application and is readily stored electronically. For example, the storage of music in rewritable electronic media has become a popular method in which to maintain and access music collections. Another example involves video applications, where digital recording and storage of television and personal video collections has become popular. Photos are often stored and accessed electronically, instead of relying upon conventional printed photos and physical photo albums.

As the electronic storage of content and other data grows in popularity, access to the data as well as convenient manners in which to transfer and store the data become increasingly important. For example, sales of music in downloadable audio formats are becoming increasingly popular. Digital audio players based in the home or office or mobile players that can be used in autos, laptop computers, personal listening devices and others are used for playback of this downloaded music. In order to play the music, audio data is loaded onto mobile players or local computers and used to locally play the music. Typically, the amount of storage space required for storing a large volume of audio data exceeds the memory capacity of digital audio players, computers or other appliances capable of playing music. In this regard, the management and use of audio, as well as other data such as image data and video data, has become increasingly burdensome in view of the demand for and use of this data.

As applied to conventional documents and other types of data (e.g., text-based documents, spreadsheets or presentations), the demand for flexible and efficient access to such data has also grown. For example, many workplaces have become increasingly mobile; employees are often working from a remote location such as at home or at traveling locations. In some instances, devices available for use in accessing data are limited to mobile devices such as mobile telephones, personal data devices and others, with communications limited to communications mediums available to those mobile devices.

Access to data from remote locations has been particularly useful for facilitating mobility while maintaining a desirable level of access to information. However, the growing size of data files desirably transferred to facilitate mobility or to otherwise provide flexible data access has presented challenges to the delivery of such data over communications channels. For instance, email is generally limited in its ability to transfer large data files, such as audio, video, text and presentation files.

For situations in which remote access to stored data is desirable, and in particular, the increase in use and lack of availability of data transfer approaches requires the creative use of communications channels and data. To meet these and other data transfer needs, networks have been enhanced both in the ability to process larger quantities of data and in the ability to process data at a higher rate of speed. In addition, network access appliances (i.e., appliances capable of communicating over the Internet) have been improved to increase the speed at which data can be processed and transferred. However, as the demand for high quantity data transfer increases, these needs become more difficult to meet.

One challenge to the effective transfer and management of data is related to the provision of data at an acceptable transfer rate (e.g., as related to bandwidth). Certain network access appliances are limited in their ability to process audio data at different speeds, either by their internal configurations or by the availability of network access. For instance, mobile (wireless) type network access appliances can be limited by the available connectivity to mobile networks. In addition, certain network appliances may be adaptable for wired and wireless communications, with their respective ability to access data being relatively higher (e.g., faster) via wired communications, relative to wireless; when these appliances are operating via wireless communications, they may be able to receive data at a lower speed, or bitrate.

Effectively and efficiently managing data transfer via communication networks has been challenging in the face of the advancement of technologies and trade channels that use or could use network-based data transfer. In addition, the limitations of previous approaches restrict the ability to meet the demand of transferring such data between data terminals in a reliable, secure, efficient and affordable manner.

SUMMARY OF THE INVENTION

The present invention is directed to approaches to data routing, management and associated applications for selectively transferring data over a particular communications medium to a remote device. The present invention is exemplified in a number of implementations and applications, some of which are summarized below.

According to an example embodiment of the present invention, an approach to data routing involves the selective use of available communications links to facilitate desirable aspects for the transfer of data to a remote appliance.

According to another example embodiment of the present invention, a system facilitates data transfer in a network environment including a plurality of registered data sources and a plurality of remote packet-communicating devices that communicate over at least two communications link-types. The system includes a host server that directs the routing of data to one of the remote packet-communicating device over a selected one of communications links available for directly communicating with the remote packet-communicating device. Each registered data source includes a software-implemented routing controller that routes accessed data over the Internet. The host server responds to a request for data transfer from a registered data source to a remote packet-communicating device by authenticating the request as a function of authorization criteria. For authenticated requests, the host server ascertains information about communications links available for directly communicating with the particular remote packet-communicating device for transferring the requested data thereto. The host server then selects one of the available communications links as a function of the ascertained information (e.g., by selecting one of the links using one or more criteria). The host server then administratively controls the registered data source for routing the requested data between the registered data source and the particular remote packet-communicating device over the selected communications link.

In another example embodiment of the present invention, a system provides access to a hosted packet-based interface by one of a plurality of remote packet-communicating devices over a selected one of available network links. The system includes, at the remote packet-communicating device, a communications circuit (e.g., a programmable processor) adapted to detect at least two network links available to the remote packet-communicating device and to communicate information characterizing the detected network links over a packet-based network. The at least two network links are links that communicate directly with the remote packet-communicating device (e.g., links that facilitate one of two or more different types of wireless communications receivable by the remote packet-communicating device). A host server receives the communicated information characterizing the detected network links via the packet-based network. In response to a request from the remote packet-communicating device for access to the hosted packet-based interface, the host server selects one of the detected network links and provides access to the hosted packet-based interface via the selected network link.

According to another example embodiment of the present invention, an approach to communications is implemented using a network environment including a plurality of registered data sources and a plurality of remote packet-communicating devices that communicate data over at least two communications link-types. The approach involves a host server-implemented method for routing data between a registered data source and a remote packet-communicating device over a selected one of available communications links. In response to a request for data transfer from a particular registered data source to a remote packet-communicating device, the request is authenticated as a function of authorization criteria (e.g., by comparing authorization information in the request with stored authentication data such as a user name and password). For authenticated requests, information is ascertained about communications links available for directly communicating with the particular remote packet-communicating device for transferring the requested data thereto. One of the available communications links is selected as a function of the ascertained information (e.g., by selecting a least-coast link or a highest-bandwidth link). The particular registered data source is administratively controlled by the host server for routing the requested data from the registered data source to the particular remote packet-communicating device over the selected communications link.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different communications approaches, and the invention has been found to be particularly suited for selective routing of data to remote packet-communicating devices capable of receiving data via two or more communications links. While the present invention is not necessarily limited to such applications, aspects of the invention may be appreciated through a discussion of various examples using this context.

According to an example embodiment of the present invention, a network-hosted routing system selectively implements an appropriate communications link to route data from a data source to an authorized user at a remote packet-communicating device (e.g., an Internet access appliance/device), in response to a data request from the authorized user. A network-based routing server selects an available link using one or more of a variety of approaches, depending upon the implementation. For instance, preferences of one or more users and/or data providers involved in the routing of the data, available communications links, characteristics of the data and other conditions associated with each particular implementation are selectively used in selecting a link.

Where a single type of link (e.g., wireless Internet link) is available for routing data to a remote packet-communicating device, that link is selected and implemented for serving the data request. One example of such a single type of link is a mobile telephone link to which a mobile telephone user is connected (e.g., using a packet-communicating mobile telephone) in making the data request and for receiving the routed data.

Where multiple links are available to effect transfer of the requested data, the network-based routing server selects one or more of those multiple links. For instance, where two or more links can be used concurrently or otherwise in connection with each other to effect data transfer, the two or more links are selected and used to route requested data. This approach may be useful, for example, to effect the transfer of data in a more rapid manner than achievable using only one link. In another instance, the network-based routing server selects one of two or more links that facilitates a relatively higher rapid data transfer than other available links. With these and other approaches discussed herein, the delivery of data is effected in a highly flexible, selective and where appropriate, efficient and/or economical manner.

In the context of these and other example embodiments discussed below and/or shown in the Figures, mobile devices that are packet-communicating (i.e., capable of communicating via the Internet) include, for example, one or more of a personal or laptop computer, a mobile telephone, a personal data assistant, a digital audio player, a camera or a video device. Similarly, data or content sources include, for example, packet-communicating devices and/or devices in communication with another packet-communicating device at a common location. For instance, data sources may include one or more of a home or business personal computer that can access stored data such as media stored at a local hard disk drive, a video storage device or other another data storage/access device.

In some applications, the network-hosted routing system stores or otherwise accesses user preferences set by one or both of a user providing data for transfer and a user receiving the data at a remote packet-communicating device. The network-based routing server implements these user preferences when selecting an available link for routing data. For instance, where user preferences indicate that data must be routed over a particular communications medium such as a wireless Internet, wired Internet or mobile telephone medium, the network-based routing server selects a communications link meeting the specified routing preferences.

Where user preferences specify a certain communications link-type as preferred over another communication link-type, the network-based routing server selects the preferred communications link when available, and selects another link when the preferred link is unavailable. In some applications, user preferences specify a ranking among several communications link-types. In other instances, user preferences specify one or more preferred communications link-types in accordance with other conditions, such as time of day, date, type of data to be transferred, cost or others. In these instances, the network-based routing server uses these conditions with the user preferences to select and implement a particular communications link for transferring requested data.

Where no communications link meets specified routing preferences, the network-based routing server does not transfer data in accordance with the request and, where appropriate, communicates an indication of a failed transfer with other transfer options, if available. As with the above discussion, user preferences may indicate a course of action to take when such a condition arises; in these instances, the network-based routing server acts in accordance with the specified routing preferences.

In one particular example embodiment of the present invention, approaches similar to those discussed above are implemented in a peer-to-peer network routing system for sharing data and/or content such as data-rich media bearing audio and/or video. Personal computers or other devices at base locations such as a home or office are programmed with routing functions to interact with a network-based router or routers (e.g., each base location routing programming acting with the network-based router to implement network-distributed routing functions). Users at these base locations subscribe to routing services offered via the network-based router and establish preferences and authorizations used to effect routing of content from the base locations. These authorizations specify one or more users authorized to access the content at each particular base location, as well as any limits as to the content available to each user. In some applications, the one or more users includes the same user at the base location, such as where an individual wants to access his or her content from a remote packet-communicating device. In certain applications, an authorization is associated with a particular packet-communicating device, such as a mobile telephone or laptop computer, via which a remote user is requesting access to data. The network-based router controls the routing of content from these base locations to remote packet-communicating devices over a communications link selected using by authorizing requesting users at the remote packet-communicating devices and by implementing selective communication link approaches such as those discussed above.

In another peer-to-peer embodiment, a host server provides a personal network service using routing software implemented at the host server and at a base network node to connect a user at an Internet access appliance to data available at the base network node. The host server facilitates an intelligent interface accessible by the Internet access appliance and further facilitates the selection and delivery of data from the base network node to the Internet access appliance. In selecting a communication link over which to pass data, the host server uses information related to one or more of a user at the base network node, a user at the Internet access appliance, availability of communications links, cost and/or transfer rate associated with available communications links, type of Internet access appliance and type of data to be transferred.

In some applications, data requested for transfer is configured for use at the at the remote network access appliance using information characterizing a selected communication link over which the data is to be routed. For example, where available communications links for transferring data to a requesting Internet access appliance are relatively low in bandwidth, the host server facilitates the configuration of the data into a format that requires less bandwidth for transfer, automatically and/or at the direction of a user. This approach is useful, for example, for transferring media files that are capable of access at various bitrates; where communications links are relatively low in bandwidth, the data is configured to a format bearing a relatively low bitrate for transfer. In some applications, the host server facilitates the configuration of data at the base network node bearing the data. In other applications, the host server configures the data itself and/or at a location remote from the base network node, prior to sending the data to the Internet access appliance.

In one implementation, a user remotely accesses his or her audio content stored at a home personal computer using a telephone Internet appliance capable of communicating via relatively high-bandwidth wireless Internet links (e.g., via a local wi-fi access point) and via relatively lower-bandwidth wireless telephone links. In many applications, audio content (e.g., stored music) is stored in a format corresponding to a relatively high bitrate, which is associated with higher quality as commensurate with, for example, music recorded upon and sold with compact discs. When a wireless Internet link is available and selected as a communication link via which to deliver the audio content, the host server selectively delivers the requested audio content using the relatively high bitrate as stored at the user's home personal computer. When a relatively low-bandwidth wireless telephone link is selected for transfer, the host server selectively directs the configuration of the audio content to a lower bitrate (e.g., and generally lower quality) format and delivers the configured audio content.

In some instances, data is configured in response to available or selected communications links to facilitate communications over the selected link. For instance, where data is more efficiently communicated over a particular link in a new format that is different than an original format in which the data is available, the host server directs the configuration of the data to the new format. This configuration may be effected at the source of the data and/or at the host server or otherwise before communicating the data over the selected communications link. In addition and/or alternative to efficiency, a variety of other characteristics are considered in configuring data for transfer over a selected communications link type. For instance, a desirable codec for a selected link, a reliability characteristic of a particular data type used with the selected link and bandwidth consumption characteristics are considered when configuring data in certain applications.

Figure 1:
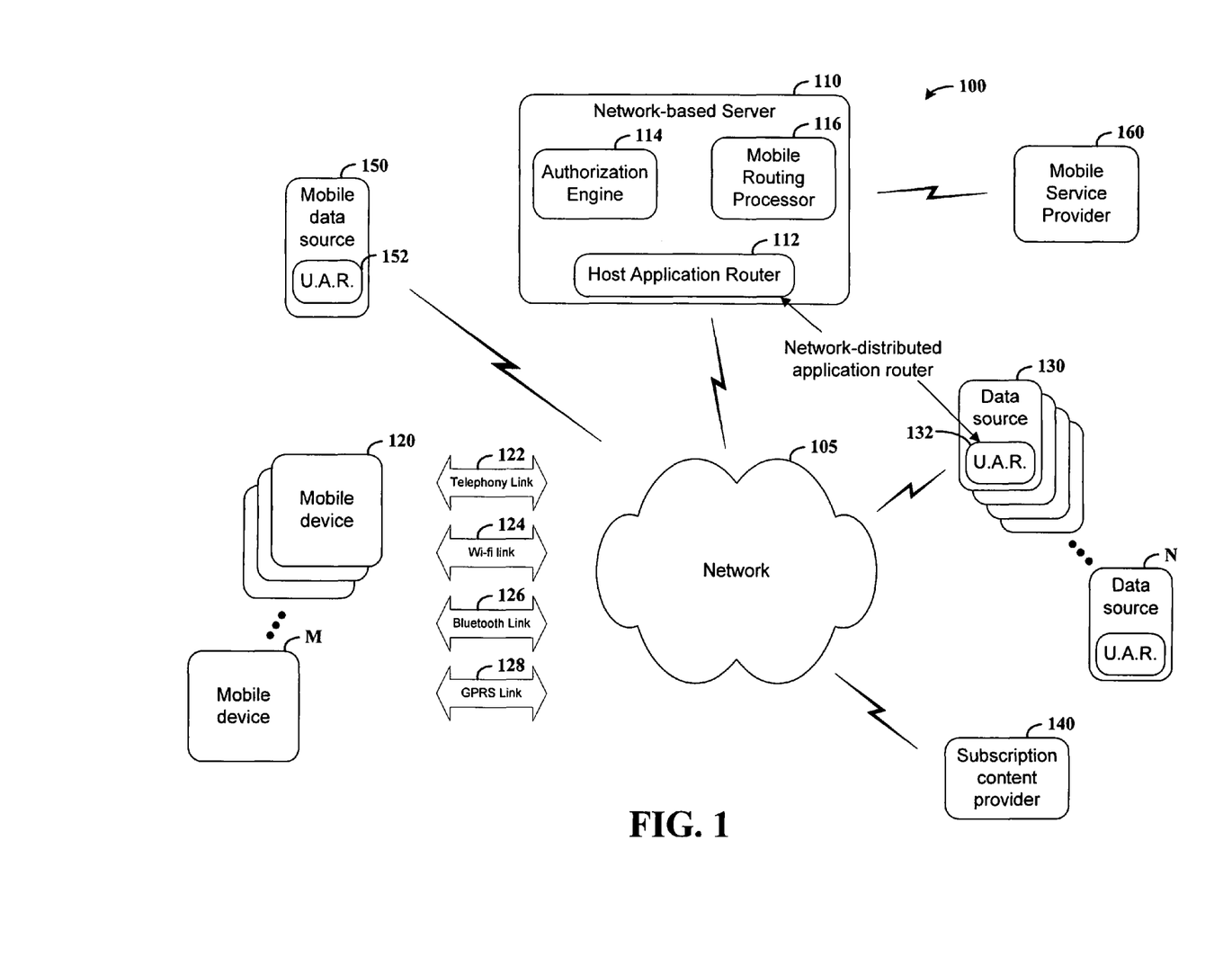
FIG. 1 is a system for routing data via a packet-based network and one of a plurality of available communications links using a server-hosted routing approach, according to an example embodiment of the present invention.

Turning now to the figures, FIG. 1 is a system 100 for routing data to mobile packet-communicating devices over an Internet protocol network and using one or more of a variety of available communication link-types, according to another example embodiment of the present invention. The system 100 includes a network-based server 110 that facilitates routing and communications link selection, a plurality of remote packet-communicating devices 120-M and a plurality of data sources 130-N, all of which communicate via a network 105. The packet-communicating devices 120-M include one or more of a variety of devices or appliances capable of accessing the Internet, such as mobile telephones, laptops and others as discussed above with packet-communicating devices. Similarly, the data sources 130-N include one or more of a variety of devices such as a personal computer or others as discussed above with data and/or content sources belonging to or otherwise accessible by a particular registered user (e.g., a registered person or entity).

The network 105 includes an internet protocol-based network such as the Internet and, where appropriate, one or more other networks such as a mobile telephone network or a local area network (LAN). Additional communication links are part of and/or communicate with the network 105; such links include one or more of telephony link 122, wi-fi (wireless Internet) link 124, Bluetooth link 126, and GPRS (General Packet Radio Service) link 128. In some applications, the network 105 includes a local area network implemented for a locality such as a home or business. In other applications, the network 105 is or includes a virtual network or set of virtual application communication channels within a processor or group of processors associated with a computing appliance.

The network-based server 110 includes a host application router 112 that interacts with user application routers at each data source and hosts the interface, e.g., as an Internet web page. In this regard, each data source includes such a user application router, with data source 130 shown including a user application router (U.A.R.) 132. Some or all of the functionality implemented with the network-based server 110 and the data sources 130-N are implemented, for example, with a processor, computer or arrangement of computers programmed to carry out the functionality discussed herein.

The host application router 112 works together with each user application router to make up a network-distributed router, the host application router operating personal network-distributed routers for each user, such that each user's personal router (e.g., each user's personal network) includes that user's application(s) at the user's data source(s) operating together with the host application router. In this context, the network-distributed nature of routing functions are implemented across a combination of the host application router 112 with a single user application router, and in some applications, across a group of two or more user application routers working with the host application router. In some applications, the user application router 132 is configured at the network-based server 110 and downloaded to data sources as a software download, and implemented on an appliance such as a personal computer or a network router. Each user can thus access his/her data at the user's data source or nodes, using his/her personal router and data at the user's data source(s).

The network-based server 110 also includes a mobile routing processor 116 that selectively implements one or more of the exemplary communication links 122-128 (or other available communications links) to direct routing of data to the mobile packet-communicating devices 120-M. For instance, where a particular mobile packet-communicating device has access to one or more of the communication links 122-128, the mobile routing processor 116 selects one of the available links using a variety of approaches ranging from cost-based approaches to user-preference based approaches and others, as well as combinations thereof. Such approaches are discussed further below.

In some applications, the mobile device 120 detects communications links that are available to it, such as by polling for wireless or wired communications links available for communications. In some applications, the detection is automatic, such as via a programmed application routing function in the mobile device 120 that automatically communicates with the network-based server 110. The mobile device 120 sends information characterizing the detected communications links to the network-based server 110, either automatically or when the mobile device 120 is requesting data. The network-based server 110 can then select from the detected communications links when facilitating the routing of data to the mobile device 120. For example, where the mobile device 120 is a mobile telephone having wi-fi communications abilities, it may send information to the network-based server 110 over a mobile telephone communications link (e.g., telephony link 122), identifying the wi-fi link 124 as available for communications. The network-based server 110 can then select one or both of the telephony link 122 and the wi-fi link 124 for the transfer of data to the mobile device.

The network-based server 110 selectively facilitates user access to data via one or more of the data sources 130-N, from an authorized user at one of the remote packet-communicating devices 120-M. The network-based server 110 implements an authorization engine 114 for authenticating a particular user in response to a request for access to data made available via one of the data sources 130-N or one of the remote packet-communicating devices 120-M. In this regard, when a user at a remote packet-communicating device requests data such as image, audio and/or video media content from a particular data source, the network-based server 110 processes an authorization for the request by the user, implementing the authorization engine 114 to access user data and authorizing the user as a function thereof. If the authorization is successful (e.g., authorization criteria are met), the network-based server 110 facilitates the communication of data from one or more of the data sources 130-N to one of the remote packet-communicating devices 120-M to which the user requested data.

The network-based server 110 also selectively facilitates user access to a variety of other data sources, directly or implementing one of the data sources 130-N. A subscription content provider 140 and a mobile data source 150 are shown as two such example data sources. The mobile data source 150 includes a mobile U.A.R. 152, implemented similarly to the data source 130 and U.A.R. 132 combination. The mobile data source 150 may include, for example, a notebook computer, a packet-communicating mobile telephone, packet-communicating camera or other packet-communicating device.

The subscription content provider 140 may, for example, be implemented in a manner similar to the data source 130, with a U.A.R. integrated therewith. Content made available via the subscription content provider 140 may include, for example, subscription content such as digital audio content, video content, live performance content such as a sporting event or concert, television content, radio content and news content.

In some applications, the network-based server 110 facilitates the routing of content directly from the subscription content provider 140, implementing U.A.R. functions thereat to make subscription content available to one of the mobile packet-communicating devices 120-M. Users requesting subscription content via one of the mobile packet-communicating devices 120-M are authorized via the network-based server 110 and, therein, allowed access to appropriate content available from the subscription content provider 140. In certain applications, the subscription content provider 140 specifies rules for passing subscription content that specify or otherwise characterize communications links that can be used with its subscription content; the network-based server 110 uses this information in selecting an available communications link.

In other applications, the network-based server 110 facilitates the routing of content from the subscription content provider 140 via a data source such as data source 130. For instance, where data source 130 is a registered user's personal computer at his or her home or office, that registered user may have a subscription for content such as television services from the subscription content provider 140 (via the Internet or otherwise). In such an instance, the network-based server 110 implements the host application router 112 and the U.A.R. 132 to use the personal computer to access content from the subscription content provider 140. The content is then either received via the data source 130 and re-routed to a requesting mobile packet-communicating device, or routed via the network-based server 110 without necessarily routing the content to the data source 130. As discussed above, one of the available communications links 120-128 is selectively implemented by the network-based server 110 to facilitate the routing of subscription content from the subscription content provider 140 to a requesting mobile packet-communicating device. The network-based server 110 selectively uses characteristics such as size, quality, security and any associated bandwidth requirements of the subscription content when choosing one of the communications links.

The mobile routing processor 116 makes a selection among available communications links using one or more of a variety of approaches. In some embodiments, a least-coast approach is implemented in selecting a communications link or links to be used to communicate data to a particular mobile packet-communicating device. The least-cost approach may involve, for example, identifying costs associated with available links, using the requesting mobile packet-communicating device, information at a data source from which data is requested, hosts of the available links or other approach. These identified costs are used to select a least-cost link or, where appropriate, a least-cost link among those links deemed acceptable by a user or via other approach, or as appropriate with an integrated approach discussed below, considering various link and/or data characteristics and, as appropriate, weighting those characteristics.

In other embodiments, the mobile routing processor 116 uses capabilities of available communications links in selecting a link for transfer. These capabilities may include, for example, bandwidth, latency, security, reliability, or a link's ability to adaptively route data when a link is interrupted and/or when a mobile user moves between service areas. For example, where content requested by a particular mobile packet-communicating device requires relatively high bandwidth, such as often required by or desirably used with video content, the network-based server 110 implements a communications link that facilitates the required or desired bandwidth. Where requested data is confidential or protected by rights such as digital media rights associated with copyright or other protective approaches, the mobile routing processor 116 selectively chooses an available communications link in consideration of security associated with that link. Where time for delivery is important, whether over a high or low bandwidth communications link, latency is also considered in selecting an available for certain applications (e.g., where a link includes a satellite link), with a low-latency link selected to facilitate faster transfer. Other communication link capabilities in addition to security are similarly considered and implemented as appropriate by the mobile routing processor 116.

In one implementation, the network-based server 110 generates a buffer or cache (e.g., at the server 110 or at a remote location) for storing data when a selected communications link is subject to speed, bandwidth, reliability or other conditions benefiting from the interim storage of data being transferred. For example, where a selected communication link is unreliable, the network-based server 110 can use a buffer to maintain data for re-routing upon failure of a particular link. As another example, an available link may involve a relatively high-speed link, in comparison to a link available to retrieve data from a data source. In this regard, the network-based server 110 selectively uploads or otherwise accesses data from a data source such that subsequent transfer of the data to a mobile device can be effected at a faster rate than that at which the data was obtained from the data source.

In another example embodiment, the mobile routing processor 116 monitors conditions of available communications links for use in selecting one of the communications links over which to communicate requested data. For example, data traffic over a particular communications link can be monitored and used to determine speed, accuracy or other related characteristic of the communications link. Where two similar links are available, the mobile routing processor 116 can choose one of the two links having less data traffic thereon. Where accuracy is of particular importance, data is selectively transferred over communications links exhibiting accurate (e.g., relatively loss-free or corruption-free) data transfer. Similarly, performance of a particular communications link over time can be monitored and used by the mobile routing processor 116 to ascertain a reliability characteristic of the communications link that can be used in weighing characteristics of available communications links in the selection of one thereof.

Another example embodiment is directed to the routing of content to a mobile packet-communicating device moving between service areas offering similar and/or different communications links over which to communicate selected data. For example, when the mobile packet-communicating device 120 is a mobile telephone, a data request from the mobile telephone and subsequent delivery of the data may involve the use of two or more mobile communications towers as the mobile telephone moves, for example, in an automobile along a roadway. In this regard, different service areas may be encountered by the mobile telephone, with each service area offering different types of communication. For instance, when traveling near a populated area, service areas offering wi-fi Internet type connections may be encountered, as well as mobile telephony connections. When traveling in remote areas, available communications link types may be more limited, yet service areas change when moving from one area to another. The mobile routing processor 116 accordingly monitors the available communications links as the mobile packet-communicating device 120 moves and routes data in accordance with the available links.

In another particular embodiment involving the delivery of data to a mobile packet-communicating device that is moving between service areas, the mobile routing processor 116 predicts service areas into which the mobile packet-communicating device is moving. The mobile routing processor 116 then uses this predicted information to determine not only a type of communications link to use in transferring data but a time at which to make the transfer. For instance, when a user at the mobile packet-communicating device 120 requests data that is relatively large in size and generally benefits from delivery over a higher bandwidth link, the mobile packet-communicating device 120 may delay delivery of the data when the mobile packet-communicating device is predicted to move into an area with higher available bandwidth. This delay in delivery is selectively implemented automatically, and selectively at the direction of a user at the mobile packet-communicating device (with the mobile routing processor 116 making the user aware of the selective delay). These approaches are useful, for example, where requested data is not immediately needed, or when delivery characteristics outweigh timing desirability in delivery.

Another embodiment directed to the selective routing of data as communications links become available involves the specification of link types by a user requesting data. The mobile routing processor 116 implements user selections specifying a communication link type or link preference, together with a preference to delay or expedite the transfer of data in accordance with data requests for that particular user. In some applications, users specify communications link-types via preferences stored with or accessible by the mobile routing processor 116. In other applications, users specify communications link-types with a particular request.

The mobile routing processor 116 handles many situations involving user-specified communication link-types. For example, where a user at the mobile packet-communicating device 120 requests a movie file from the data source 130 but does not intend to immediately view the movie file, that user may wish to instruct the network-based server 110 to wait until a relatively high bandwidth connection is available. Such an approach may facilitate low-cost transfer, for example, where the delivery of a movie over a mobile telephone network would require significant connection time, whereas delivery of the same movie over a local wi-fi Internet link would require relatively little connection time. Such decisions and preferences associated therewith can be established in consideration of the type of device to which data is being transferred and/or the type of service to which that device is subscribed, to enable desirable, efficient and low-cost transfer of data. A similar approach is implemented where such a user instructs the network-based server 110 to communicate data over a link offering a particular level of security; the mobile routing processor 116 processes requests from the user to facilitate the data transfer when an appropriate communication link is available, and delays the transfer of data accordingly.

In one implementation, the mobile routing processor 116 monitors for additional available communications links as a mobile packet-communicating device moves between service areas while data is being transferred thereto. As new communications links become available, the mobile routing processor 116 re-evaluates the type of communications link being used to effect the data transfer and selectively implements a new type of communications link becoming available as appropriate.

In another implementation, the mobile routing processor 116 monitors at the available communications links for a particular mobile packet-communicating device at times when data is not being transferred to the mobile packet-communicating device. The monitored available communications links are used to update a list of available links for presentation to the mobile packet-communicating device and/or use in the selection of a link to serve a request for data transfer to the mobile packet-communicating device.

In another embodiment, network-based server 110 facilitates the transfer of data to the mobile packet-communicating devices 120-N in accordance with an agreement with an operator of a mobile service provider 160. In turn, the mobile service provider offers data transfer services to its subscribers operating the packet-communicating devices 120-N. The mobile routing processor 116 processes requests for data transfer to one of the mobile packet-communicating devices 120-N in accordance with preferences set via the operator of the mobile service provider 160.

A variety of mobile service provider-types are contemplated with the discussion herein regarding the mobile service provider 160. One such provider is a mobile telephone provider. In one such example, a mobile telephone service provider offers data transfer services to a customer at mobile packet-communicating device 120. The mobile telephone service provider specifies limits as to the use of the data transfer services, such as by restricting the data transfer to communications links to which the mobile telephone service provider has access to (e.g., owns and/or has contracted for the use of). In this regard, the mobile routing processor 116 facilitates the transfer of requested data to the mobile packet-communicating device 120 when a communication link to which the mobile service provider 160 has access to is available for use in effecting the transfer. Such a link may be implemented in accordance with, for example, what is often referred to as an "in-network" type of link, or where the mobile packet-communicating device 120 (telephone) is in the mobile telephone service provider's (160) network.

As discussed with certain applications above, the mobile routing processor 116 selectively implements user preferences in selecting communications links, the preferences stored at and/or accessible by the mobile routing processor 116. In some applications, such preferences are set by a user either at a data source providing data for routing or at a mobile packet-communicating device to which data is being transferred. These preferences may specify a particular communications link type or types, or specify other characteristics to consider such as cost, security, speed, reliability and more as can be associated with communications links.

In certain applications, preferences are set by a user at a mobile packet-communicating device to specify that the mobile routing processor 116 identify available communication link selections to the user at the mobile routing processor. The mobile routing processor 116 presents these selections using, for example, a web interface specifying available communications links as well as related information such as cost, security, quality, speed or other characteristics associated with each link. The user at the mobile packet-communicating device can then select one of the available communications links, the selection is passed to the mobile routing processor 116, which selects the selected one of the available communications links.

The network-based server 110 uses a priority associated with data to be transferred in selecting a particular communications link in connection with certain example embodiments of the present invention. For example, where a certain type of communications link is implemented for relatively high priority data, such high priority data is selectively communicated over the type of communications link, with relatively lower priority data communicated over other links. In this context, high priority may be associated with a particular bandwidth, such that a particular set of data to be transferred having a relatively large size may be associated with a higher priority transfer, relative to another (smaller) set of data that can be transferred over a lower-bandwidth communications link in an acceptable amount of time.

Routing priority is determined in a variety of manners such as by user preference, time, type of data, subscriptions associated with one or both of a data source and remote recipient, available links or fee associated with a particular transfer of the data. The network-based server 110 uses this priority in selecting a communications, either solely or in connection with other selection criteria as described herein.

In another embodiment, data communicated to one of the remote packet-communicating devices 120-M is selectively configured at the direction of the network-based server 110 for delivery over a particular selected communications link in a manner similar to that discussed above. For example, in situations where communications links available for delivering requested data from the data source 130 are limited in bandwidth, the network-based server 110 facilitates the configuration of the requested data into a format more easily transferred over a limited bandwidth communications link. Once such application involves the streaming of video data; when available bandwidth is low, the network-based server 110 directs the configuration of requested video data into a lower bandwidth format (e.g., lower resolution). This configuration is selectively carried out at the network-based server 110 or, in some applications, at the data source 130 via the host application router 112 controlling the U.A.R. 132.

Another data configuration example is related to the security of available communications links. The network-based server 110 selectively configures requested data to facilitate confidentiality, media rights or other security-related conditions. For instance, where an available communications link selected for the transfer of confidential data is not necessarily secure, the network-based server facilitates the configuration of the data into a secure format, such as by encrypting the data. This approach may involve, for example, configuring the data in an encrypted format in accordance with user preferences or profiles, such as those specifying a user name and password and/or a cryptographic key, accessible by the network-based server 110. Such preferences or profiles can be stored, for example, at the data source 130, at the network-based server 110 or at any location accessible by the network-based server.

In some applications, a user of the data source 130 specifies security conditions related to data accessible thereby and available communications links. The network-based server 110 uses these security conditions in determining any configuration approaches to implement in connection with the data. In addition, these user-specified security conditions may further specify that certain data can be delivered only over a particular communications link type, or that the data cannot be delivered over particular identified communications link types. Where available communications links do not meet specified link-type security conditions, the network-based server 110 denies requests for delivering requested data or, in some applications, waits until an appropriately secure communications link becomes available (e.g., as discussed above) and sends the data over the secure communications link.

One security-related application involves the transfer of content, such as that available from subscription content provider 140. Where communications links are secure (e.g., as known or specified by the subscription content provider 140), the subscription content is delivered in a relatively unprotected format, for example by delivering an entire set of media content (e.g., a movie). Where the security of available communications links is suspect, the subscription content is protected or otherwise transferred in a manner that mitigates copying. In one instance, using the example of a movie again, the network-based server 110 delivers only a portion of the movie content at a time so that any intercepted portion of the movie is incomplete and where intercepting all portions of the movie is unlikely or difficult. Another approach to protecting such movie content involves the delivery of a substantial portion of the content while separately delivering information necessary to view the movie; certain applications involve the use of a cryptographic key or other approach to facilitate such delivery.

In some applications, the configuration of data is implemented using a plug-in at a data source that is adapted to access information tagged to stored data in order to present the data to a remote packet-communicating device. When a configuration selection is made, be that selection a manual user-made selection or a selection automatically made via the network-based server 110, the plug-in then uses the selection and facilitates the transfer of the requested data. Where appropriate, a MIME handler plug-in is implemented to transcode the requested data into a MIME type that can be implemented by the remote packet-communicating device via which the request has been made. These plug-in approaches may, for example, be implemented in a manner similar to that discussed above in configuring data.

The network-based server 110 uses data specifying each of the data sources 130-N for use in communicating with and/or accessing each data source, such as the data source's address relative to the network 105 (e.g., a registered user's IP address and/or name space address) and security information. Where a user has more than one data source, such as with a household "user" having different computers used by different household members, or wherein different data sources for a particular registered user (e.g., an individual or an entity) are located at different places on a network, the network-based server accesses information identifying these multiple data sources. User access with multiple data sources in a household typically involves the network-based server providing an interface for, and access to, multiple computers to individuals associated with the household or business (and having the corresponding authorization). User access with multiple data sources across a network wherein, for example, a user has different data source locations such as different places of residence and/or business, similarly involves the provision of access to multiple computers at different locations on a network, with a portion of a routing controller (U.A.R.) implemented at each location.

The system 100 is adapted to work in a variety of environments involving disparate networks, data source devices, remote packet-communicating devices, data and characteristics thereof. One particular use-case scenario involves remote data access as follows. When a particular user who is party to the data source 130 (e.g., a homeowner having media content stored at his or her home computer) wishes to establish remote access, the user signs up for a service provided via the network-based server 110. The network-based server 110 prompts the user for access information to the user's data source 130 so that the host application router 112 can interact with the user's data source. This access information includes sufficient information for identifying the data source 130 on the network 105 and other appropriate information, such as data locations at the data source 130 that are accessible by the network-based server (and/or by remote packet-communicating devices). The access information is stored with the configuration data 116, together with other information for the user as appropriate for the particular implementation.

The user application router 132 (software implemented, e.g., on the user's home computer, router or other network appliance) is installed at the user's data source 130 and is configured for operation in connection with the host application router 112. As appropriate, the data source 130 then contacts the network-based server 110 to establish communications therewith and to facilitate remote access to data at the data source 130. In some instances, some of the functions discussed as carried out with the host application router 112 are established and/or implemented at the user application router 132, such as the limiting of access to particular data locations at the data source 130.

An account is established for the user, with service type information (e.g., billing information) at the network-based server 110. The account includes authorization information established with the user, which is presented to the user for use in accessing the network-based server and, accordingly, his/her data source 130 as well as account information via the network-based server. This authorization information is stored with authorization criteria accessed by the authorization engine 114.

A user (e.g., the registered user or a guest user) employs the remote packet-communicating device 120 for accessing data at the data source 130 by visiting the interface (e.g., web browser) presented by the network-based server on behalf of the user. In some applications, a user application router type function is also implemented at the remote packet-communicating device 120. This data access may involve, for example, the use of a mobile telephone as the remote packet-communicating device 120, with the interface being accessed as a web page via the mobile telephone. The user provides authorization information to the network-based server 110 via the interface. The authorization information may involve one or both of user-input authorization information (e.g., a password or voice for voice recognition) and identification information associated with the remote packet-communicating device 120. The network-based server 110 uses the authorization information together via the authorization engine 114 to determine whether access is authorized.

Once the user has been authorized via the remote packet-communicating device 120, the network-based server provides the user with information regarding available data such as media content via the interface, viewed as a web page. One or both of the data source 130 and the network-based server 110 provide some of or the entire interface and a listing of available data for transfer. The listing of data may be tailored to a particular user's preferences, device capabilities, or otherwise limited in scope to restrict the data to which a particular user has access. The user selects data for transfer and the host application router 112 responds by interacting with the home application router 132 to facilitate the transfer of data to the remote packet-communicating device 120. This data transfer is carried out in accordance with the user's selection and the configuration data 116.

In one application involving a mobile telephone as a remote packet-communicating device, the application router 112 identifies the location of the mobile telephone and uses the location in selecting a communications link over which to send data to the mobile telephone. This identification may be facilitated using, for example, the identification of a local transmission location (e.g., a transmission tower or GPS) via which the mobile telephone communicates.

In another example embodiment, the network-based server 110 facilitates the transfer of data from one of the remote packet-communicating devices 120-M to one of the data sources 130-N, using an authorization approach similar to that discussed above as well as a similar approach to selecting one of available communications links. For example, when a user at the remote packet-communicating device 120 wishes to send an image to his/her data source 130, that user accesses an interface provided via the network-based server 110. Once authorized, the user uploads the image to the data source 130 via a selected communications link. With this approach, image storage is facilitated with the remote packet-communicating device 120 while utilizing the data storage capabilities of the data source 130.

Figure 2:
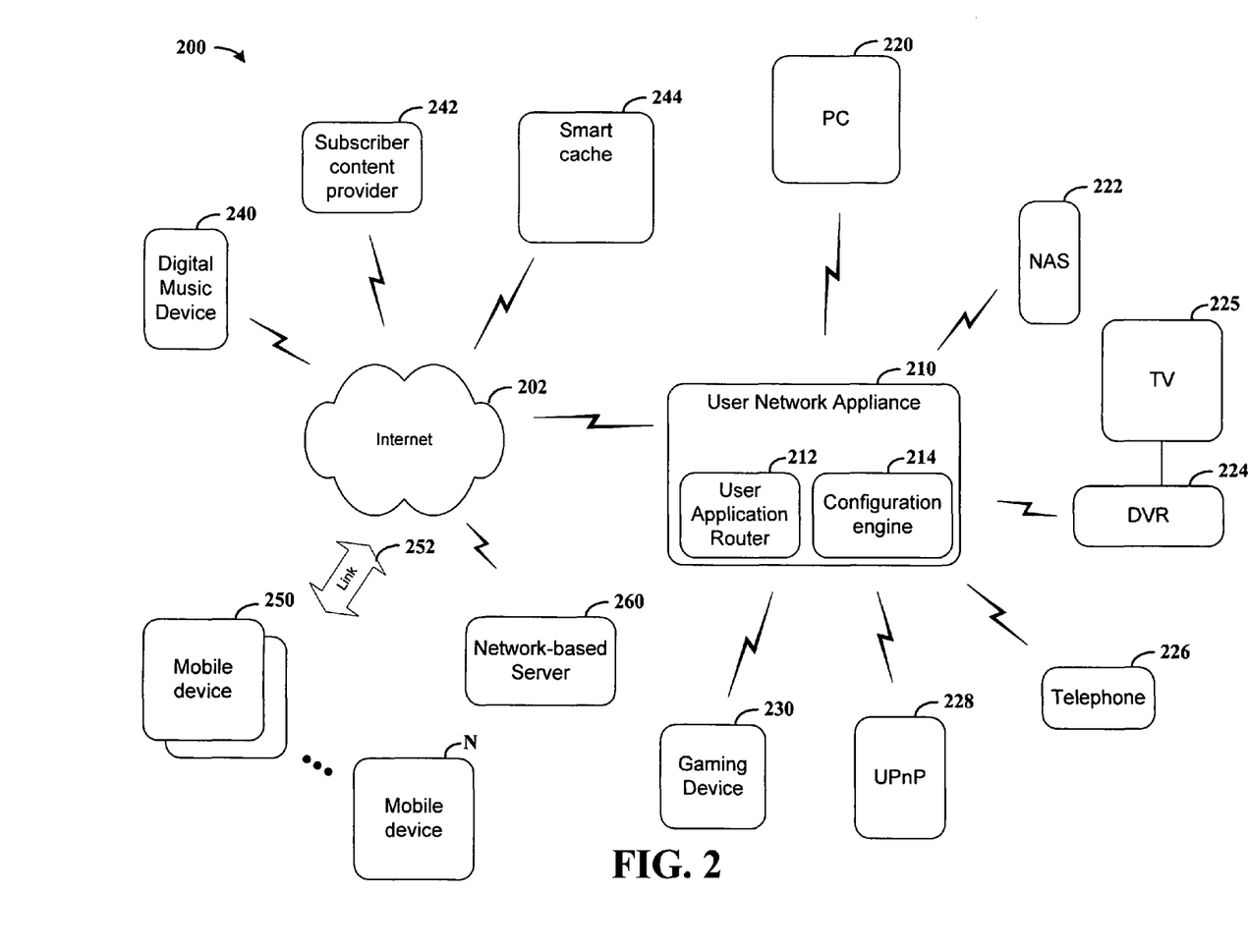
FIG. 2 is an arrangement and approach to selectively routing data to a remote packet-communicating device via one of available communications links with selective data configuration, according to another example embodiment of the present invention.

FIG. 2 shows a network arrangement 200 for the selective communication of content to one of a plurality of mobile packet-communicating devices 250-N via the Internet 202, according to another example embodiment of the present invention. The arrangement 200 is implemented using an approach similar to that shown in FIG. 1; correspondingly, the approach shown in FIG. 1 is selectively implemented using one or more of the various approaches and content sources as shown in and described in connection with FIG. 2.

The arrangement 200 includes a user network appliance 210, implemented with a packet-communicating device such as a router, PC or other computer-type device capable of accessing the Internet either directly or via another device such as a modem. In this regard, the user network appliance 210 is selectively included with one of a plurality of content source devices 220-230, discussed further below. The user network appliance includes a user application router 212 and, in certain applications, a configuration engine 214. The user application router 212 operates in a manner consistent with the U.A.R. 132 in FIG. 1, in communicating with a network-based server 260 and selectively routing content in response thereto. Further referring to FIG. 1, each data source (e.g., data source 130) selectively includes an arrangement such as the user network appliance 210 and one or more of the content source devices 220-230. Content source devices shown by way of example include a personal computer 220, network attached storage (NAS) device 222, digital video recorder (DVR) 224 as shown with a TV 225 and selectively implemented therewith, a telephone 226 such as an Internet telephone, a universal plug and play (UPnP) device 228, and a gaming device 230. The user application router 212 controls access to one or more of the content sources 220-230 for transferring content to one of a plurality of mobile packet-communicating devices 250-N.

In addition to the content source devices 220-230 available via the user network appliance 210, other content source devices are available directly via the Internet 202. A digital music service 240, subscriber content provider 242 and a smart cache 244 are shown by way of example, with a variety of web-based content sources implemented in various embodiments. The digital music service 240 may include, for example, a service offering streaming audio and/or audio that can be downloaded and stored. The subscription content provider 242 may provide video, audio, news or other type of subscription service offering content. The smart cache 244 stores content on behalf of one or more registered users, such as a user owning the user network appliance 210 and any corresponding content source, therein facilitating rapid access to the content. Access to these web-based content sources is facilitated through the network-based server 260, which directs the routing of content available thereat.

In some instances, the user network appliance 210 directs routing from web-based content devices, for example by accessing the data directly and re-routing the accessed data to one of the mobile packet-communicating devices 250-N. For instance, when a registered or authorized guest user at mobile packet-communicating device 250 wishes to access a television program, the user sends a request via the Internet to the network-based server 260 to facilitate the delivery of content. The network-based server 260 communicates with the user network appliance 210 to serve the request, and further identifies a link suitable for communicating the requested content to the mobile packet-communicating device 250, for example as discussed with the communications links 122-128 shown in FIG. 1 (and with link 252 representing one or more of a plurality of links). In instances where the user's television subscription services are via the DVR 224, the user network appliance 210 communicates with the DVR to access the requested television program via the subscriber content provider 242 (here acting as a television provider). Once the television program is accessed (either directly by the user network appliance 210 or via the DVR 224), the user application router 212 routes the television program over the Internet 202 and via a selected link 252 to the mobile packet-communicating device 250.

In some applications, the user network appliance 210 implements configuration engine 214 to selectively configure data available from one or more of the content sources 220-230, or 240-244 prior to delivery to a remote packet-communicating device. This approach is implemented using a type of communications link (represented by link 252) selected by the network-based server 260. For instance, where a selected communications link has a relatively low bandwidth, the configuration engine 214 is implemented to compress or otherwise make the data available for transfer over the relatively low bandwidth, when the requested data is relatively complex (e.g., streaming high-resolution video data). For general information regarding the configuration of data, and for specific information regarding the configuration of data for communication to a particular remote packet-communicating device, reference may be made to U.S. patent application Ser. No. 11/056,345 (EYEF.005PA), filed on Feb. 11, 2005 and fully incorporated herein by reference.

Figure 3:
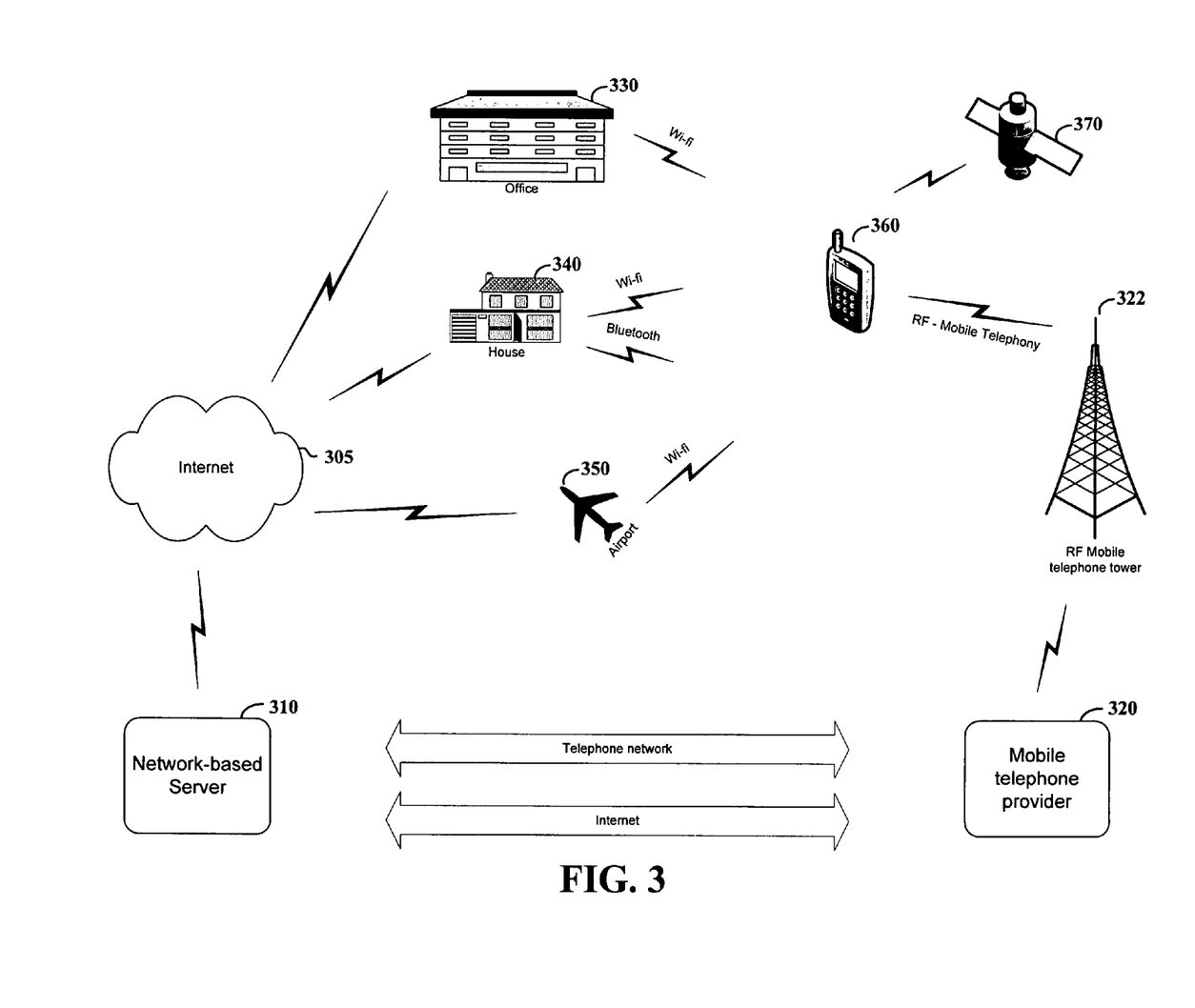
FIG. 3 shows an arrangement and approach to routing data to a mobile telephone, according to another example embodiment of the present invention.

FIG. 3 shows a mobile-telephone-based application involving the selection of available communications links, according to another example embodiment of the present invention. The approach shown in FIG. 3 and discussed below is applicable to a variety of types of mobile applications, involving telephones and other packet-communicating devices and involving a multitude of location-based services and communications approaches including those shown and others. In this regard, the example locations, providers and communications links shown in FIG. 3 are applicable to a multitude of such approaches.

A network-based server 310 (e.g., similar to the network-based servers shown in and described in connection with FIG. 1 and FIG. 2) facilitates the selection of communications links available to a mobile telephone 360 having packet-communicating capabilities. A mobile telephone provider 320 provides mobile telephone services to the mobile telephone 360 using a mobile telephone network including radio frequency (RF) tower 322 or other communications approaches used for mobile telephones. Where appropriate, the mobile telephone provider 320 communicates via one or both of a telephone network link 321 or an Internet link 323 for communicating data or other information relative to the mobile telephone 360.

Three example locations are shown, including an office location 330, house 340 and an airport 350, with each location selectively offering one or more wireless communications links for use by the mobile telephone 360 when in range. In this regard, when the mobile telephone 360 is in range of one or more of the wireless communications links offered at these example locations, communications are available to the mobile telephone via these links as well as the RF mobile tower 322.

In certain applications, a communications link via the mobile telephone provider 320 is not available (e.g., when the mobile telephone 360 is in a location that does not offer mobile telephony service). In these or other applications, the mobile telephone can communicate via the location-based link or links available without necessarily communicating using a mobile telephony link provided by the mobile telephone provider 320.

The network-based server 310 identifies communications links available to the mobile telephone 360 in one or more of a variety of manners. For example, when the mobile telephone 360 is brought into the airport 350 (offering a wi-fi link), the wi-fi link can be sued in transferring data to the mobile telephone. A user at the mobile telephone 360 can access a web page hosted by the network-based server 310, either via the wi-fi link or via web-based services made available by the mobile telephone provider 320. Once logged on, the user can provide information to the network-based server 310 that facilitates the identification of available communications links. In some applications, the user provides information directly by interacting with the web page. In other applications, the mobile telephone 360 automatically provides information to the network-based server 310 without necessarily requiring user action.

When the network-based server 310 determines that a location-based network link is available to the mobile telephone 360, data communications are selectively sent via the location-based link, generally facilitating higher data transfer rates than mobile telephone links and, in many instances, relatively more economical data transfer. In some applications, the location-based link is also used for telephony communications, e.g., where the mobile telephone is configured for internet protocol (IP) telephony type communications.

In some applications, the network-based server 310 uses the location of the mobile telephone 360 to identify wireless communication services available thereto. For example, where the mobile telephone 360 is equipped with global positioning services (GPS) capabilities, the telephone communicates with a satellite 370 in identifying its position. This position may be communicated to the network-based server 310 via the mobile telephone provider 320 or another approach. Once the position of the mobile telephone 360 is determined, the network-based server 310 uses that position to identify available communication links (e.g., using a database or other approach to identify available links).

Once the network-based server identifies wireless services based upon the location of the mobile telephone 360, it uses the location in one or more of a variety of manners in facilitating communications with the mobile telephone. In some applications, the network-based server 310 selects one of available links directly. In other applications, the network-based server sends information to the mobile telephone 360 (e.g., via the mobile telephone provider and/or one of available location-based links), and a user can select from available links. For example, when a user of the mobile telephone 360 is at the airport 350 and a pay-per-use wi-fi Internet link is available, the network-based server 310 can notify the user that the link is available and the user chooses whether or not to pay for access to the link.

In another implementation, the network-based server 310 identifies location-based communication links available to the mobile telephone 360 in areas that are not immediately accessible by the mobile telephone and uses that information in making a data routing decision. For instance, where the location of the mobile telephone 360 is determined using, for example, a GPS approach as discussed above or via information available through the mobile telephone provider 320, that location can be used to identify nearby location-based communications links.

Once nearby location-based communication links are identified, this information can be made available to a user at the mobile telephone 360, for example by informing the user that a link is available at a nearby location (e.g., a local coffee shop offering wi-fi Internet access). If a user wishes to access data benefiting from such location-based link, he or she can move into range of the link (e.g., as identified via a map or other approach facilitated by the network-based server 310).

In some applications, the network-based server 310 identifies nearby location-based links available to the mobile telephone 360 and selectively routes data in accordance with a predicted or otherwise determined location of the mobile telephone. For example, where a user is traveling down a highway with the mobile telephone 360, the user's location can be tracked and used to predict where the user will be over time. The network-based server uses this information in making routing decisions. For instance, when data is requested for transfer to the mobile telephone 360, the network-based server 310 can selectively delay transfer until a desirable communication link becomes available as predicted knowing the movement of the user traveling down the highway.

In some applications, the network-based server 310 identifies characteristics such as cost, reliability, security and more associated with various communications links available to the mobile telephone 360. These characteristics are presented to the user of the mobile telephone 360, who can make an informed decision about which of available communications links to use.

In some applications, configuration settings in the mobile telephone 360, at the network-based server 310 or at other locations in communication with the network-based server are set to control the delivery of data to the mobile telephone as a function of the availability of communications links. For example, where a user requests data such as a movie or a presentation having a relatively large data file size, the network-based server 310 uses configuration settings to transfer the data when high-bandwidth link is available to the mobile telephone 360. In this regard, user configuration may be implemented to make location-based wireless transfer a desirable option for data files over a certain size, with an option to override the settings to effect transfer over a mobile telephone network. This approach may be useful, for example, where immediate data transfer is not necessary or where a user elects to wait to transfer data until a wireless internet link becomes available for economic or other reasons.

Another implementation relative to the use/selection of location-based communication links and the mobile telephone 360 involves the transfer of data from the mobile telephone to another location via the Internet 305 (or other packet-communicating network). For example, when a user at the mobile telephone 360 wishes to send a picture or other data to his or her home or work computer, the network-based server 310 either directly or indirectly facilitates the transfer of data over location-based links as appropriate using one or more of the approaches described herein to select an available link.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by host and home network nodes are selectively moved from host to home and/or home to host node, depending upon the application. This type of approach is consistent, for example, with a network-distributed data router having portions thereof implemented on both a host server and a home node, with the functions of the data router being carried out at one or both of the host and home locations. As another example, the interface provided to remote users may involve certain client-based functions and other implementations at the remote user's packet-communicating device, such as where the "remote" user is another home user node accessing a different home user node (with software implemented at both nodes). These approaches are implemented in connection with various example embodiments of the present invention. Such modifications and changes do not depart from the true spirit and scope of the present invention that is set forth in the following claims.

What is claimed is:

1. An apparatus comprising:
   at least one processor; and
   at least one memory including computer program code,
   the at least one memory and the computer program code configured to, with the at least one processor, cause the apparatus to perform at least the following,
      respond to a request for data transfer from one of a plurality of registered data sources over a network to a remote packet-communicating device by authenticating the request as a function of authorization criteria,
      receive data specifying available communications links automatically identified for directly communicating between the registered data source and the remote packet-communicating device,
      for the authenticated request, ascertain information about the available communications links for transferring the requested data to the remote packet-communicating device based upon the data specifying the available communications links,
      select one of the available communications links as a function of the ascertained information, and
      administratively control the registered data source, by sending administrative routing control inputs, for routing the requested data between the registered data source and the remote packet-communicating device over the selected communications link.

2. An apparatus of claim 1, wherein the apparatus is further caused to
   ascertain information about communications links by ascertaining cost information for routing data over at least two communications links, and select one of the available communications links by selecting one of the available communications links as a function of the ascertained cost information.

3. An apparatus of claim 2, wherein the apparatus selects one of the available communications links as a function of the ascertained cost information by selecting a least-cost route for routing the requested data.

4. An apparatus of claim 1, wherein the apparatus is further caused to
ascertain information about communications links by ascertaining cost information and a delivery-related characteristic of at least two communications links, and
select one of the available communications links by selecting a communications link as a function of a routing priority associated with the request and both the cost information and the delivery-related characteristic for each of the at least two communications links.

5. An apparatus of claim 1, wherein the apparatus is further caused to
ascertain information about communications links by ascertaining a speed at which the communications links can transfer data as a function of latency of the communications links, and
select one of the available communications links as a function of the ascertained speed.

6. An apparatus of claim 1, wherein the apparatus is further caused to
ascertain information about communications links by ascertaining a level of security associated with the communications links, and
select one of the available communications links as a function of the ascertained level of security.

7. An apparatus of claim 1, wherein the apparatus is further caused to
ascertain information about communications links by predicting the availability of the communications links, and
select one of the available communications links as a function of the predicted availability.

8. An apparatus of claim 1, wherein the apparatus is further caused to
ascertain information about communications links by ascertaining data transmission accuracy of the communications links, and
select one of the available communications links as a function of the ascertained data transmission accuracy.

9. An apparatus of claim 1, wherein the apparatus is further caused to
ascertain information about communications links by ascertaining the bandwidth of the communications links, and
select one of the available communications links as a function of the ascertained bandwidth.

10. An apparatus of claim 1, wherein the apparatus is further caused to store at least a portion of the data routed from the registered data source as a function of the information ascertained about the selected communications link.

11. An apparatus of claim 1, wherein the apparatus is further caused to
ascertain information about communications links by monitoring the communications links, and
select one of the available communications links as a function of the availability of the monitored communications links.

12. An apparatus of claim 11, wherein the apparatus is further caused to
respond to the selected one of the available communications links becoming unavailable by selecting a different one of the available communications links as a function of the ascertained information, and redirecting routing of the requested data over the different one of the available communications links.

13. An apparatus of claim 1, wherein the apparatus is further caused to
monitor data traffic on the communications links, and
select one of the available communication links as a function of the monitored data traffic.

14. An apparatus of claim 1, wherein the apparatus is further caused to select at least two of the available communications links over which to route the requested data as a function of the ascertained information.

15. An apparatus of claim 1, wherein the apparatus is further caused to ascertain information about communications links available by receiving data from the remote packet-communicating device specifying the available links with the request for data transfer.

16. An apparatus of claim 1, wherein the apparatus is further caused to ascertain information about communications links available by accessing global positioning information provided via the remote packet-communicating device.

17. An apparatus of claim 1, wherein the apparatus is further caused to ascertain information about communications links available by accessing a database bearing information about available communications links in a particular area in which the remote packet-communicating device is located.

18. An apparatus of claim 1, wherein the apparatus is further caused to select one of the available communications links as a function of the ascertained information using specified communications link preferences.

19. An apparatus of claim 18, wherein the communications link preferences are specified by a registered user of the data source from which the data is requested.

20. An apparatus of claim 1, wherein the apparatus is further caused to monitor the location of the remote packet-communicating device and selects one of the available communication links as a function of the monitored location.

21. An apparatus of claim 20, wherein, after selecting one of the available communications links, the apparatus responds to the remote packet-communicating device changing to a location with a new available communications link by re-ascertaining information about available communications links and re-selecting one of the available communications links as a function of the re-ascertained information.

22. An apparatus of claim 1, wherein the apparatus is further caused to
present web interface characterizing the information ascertained about available communications links to said remote packet-communicating device,
receive request specifying one of the available communications links via the web interface, and
select one of the available communications links by selecting the link specified via said request.

23. An apparatus comprising:
at least one processor; and
at least one memory including computer program code,
the at least one memory and the computer program code configured to, with the at least one processor, cause the apparatus to perform at least the following,
receive, via a packet-based network, communicated information characterizing network links available to one of a plurality of remote packet-communicating devices for accessing a hosted packet-based interface,
respond to a request from the remote packet-communicating device for accessing the hosted packet-based interface by authorizing the remote packet-communicating device to access a registered data source configured to communicate over the packet-based network, in response to the remote packet-communicating device being authorized, provide, via the hosted packet-based interface, information that characterizes data at the registered data source, and select one of the network links and providing access to the hosted packet-based interface via the selected network link by administratively controlling the registered data source for routing the requested data to the remote packet-communicating device via the selected network link.

24. A method comprising:

causing, at least in part, reception, by an apparatus, of information characterizing communications links available for directly communicating with one of a plurality of remote packet-communicating devices, responding, by the apparatus, to a request for data transfer from a registered data source to the remote packet-communicating device by authenticating the request as a function of authorization criteria, for the authenticated request, ascertaining, by the apparatus information about the communications links for transferring the requested data to the remote packet-communicating device using the information characterizing the communications links, selecting one of the communications links as a function of the ascertained information, and administratively controlling the registered data source for routing the requested data from the registered data source to the remote packet-communicating device over the selected communications link.

25. A method of claim 24, wherein ascertaining information about communications links includes ascertaining cost information for routing data over each of at least two communications links, and wherein selecting one of the available communications links includes selecting one of the available communications links as a function of the ascertained cost information.

26. A method of claim 24, wherein ascertaining information about communications links includes ascertaining a level of security associated with the communications links, and wherein selecting one of the available communications links includes selecting one of the available communications links as a function of the ascertained level of security.

27. A method of claim 24, wherein ascertaining information about communications links includes ascertaining bandwidth of the communications links, and wherein selecting one of the available communications links includes selecting one of the available communications links as a function of the ascertained bandwidth.

28. A method of claim 24, wherein ascertaining information about communications links includes accessing global positioning information about the remote packet-communicating device and using the global positioning information to identify available communications links.

29. A method of claim 24, wherein ascertaining information about communications links includes accessing a database bearing information about available communications links in a particular area in which the remote packet-communicating device is located and using the accessed information to identify available communications links.

30. An apparatus comprising:
at least one processor; and
at least one memory including computer program code, the at least one memory and the computer program code configured to, with the at least one processor, cause the apparatus to perform at least the following, program a plurality of registered data sources by downloading a software-implemented routing controller to the registered data sources, for remotely administratively controlling the routing of data from the registered data sources, respond to a request for data transfer from one of the plurality of registered data sources to a remote packet-communicating device by authenticating the request as a function of authorization criteria, for the authenticated request, ascertain information about communications links available for directly communicating with the remote packet-communicating device for transferring the requested data thereto, select one of the available communications links as a function of the ascertained information, and administratively controlling the software-implemented routing controller at the registered data source for routing the requested data between the registered data source and the remote packet-communicating device over the selected communications link.

31. A method comprising:

responding, by an apparatus, to a request for data transfer from one of a plurality of registered data sources over a network to a remote packet-communicating device by authenticating the request as a function of authorization criteria;

causing, at least in part, reception, by the apparatus, of data specifying available communications links automatically identified for directly communicating between the registered data source and the remote packet-communicating device;

for the authenticated request, ascertaining, by the apparatus, information about the available communications links for transferring the requested data to the remote packet-communicating device based upon the data specifying the available communications links;

selecting, by the apparatus, one of the available communications links as a function of the ascertained information; and administratively controlling, by the apparatus, the registered data source, by sending administrative routing control inputs, for routing the requested data between the registered data source and the remote packet-communicating device over the selected communications link.

32. A method comprising:

causing, at least in part, reception, by an apparatus, via a packet-based network, communicated information characterizing network links available to one of a plurality of remote packet-communicating devices for accessing a hosted packet-based interface;

responding, by the apparatus, to a request from the remote packet-communicating device for accessing the hosted packet-based interface by authorizing the remote packet-communicating device to access a registered data source configured to communicate over the packet-based network;

in response to the remote packet-communicating device being authorized, providing, by the apparatus, via the hosted packet-based interface, information that characterizes data at the registered data source, and selecting, by the apparatus, one of the network links and providing access to the hosted packet-based interface via the selected network link by administratively controlling the registered data source for routing the requested data to the remote packet-communicating device via the selected network link.

33. An apparatus comprising:
at least one processor; and
at least one memory including computer program code,
the at least one memory and the computer program code configured to, with the at least one processor, cause the apparatus to perform at least the following,
- receive information characterizing communications links available for directly communicating with one of a plurality of remote packet-communicating devices;
- respond to a request for data transfer from a registered data source to the remote packet-communicating device by authenticating the request as a function of authorization criteria;
- for the authenticated request, ascertain information about the communications links for transferring the requested data to the remote packet-communicating device using the information characterizing the communications links;
- select one of the communications links as a function of the ascertained information; and
- administratively control the registered data source for routing the requested data from the registered data source to the remote packet-communicating device over the selected communications link.

34. A method comprising:
- programming, by an apparatus, a plurality of registered data sources by downloading a software-implemented routing controller to the registered data sources, for remotely administratively controlling the routing of data from the registered data sources;
- responding, by the apparatus, to a request for data transfer from one of the plurality of registered data sources to a remote packet-communicating device by authenticating the request as a function of authorization criteria;
- for the authenticated request, ascertaining, by the apparatus, information about communications links available for directly communicating with the remote packet-communicating device for transferring the requested data thereto;
- selecting, by the apparatus, one of the available communications links as a function of the ascertained information; and
- administratively controlling by the apparatus the software-implemented routing controller at the registered data source for routing the requested data between the registered data source and the remote packet-communicating device over the selected communications link.

\* \* \* \* \*